United States Patent [19]
Levitt

[11] Patent Number: 5,384,462
[45] Date of Patent: Jan. 24, 1995

[54] PROCESS AND APPARATUS FOR LOCALIZING A SOURCE OF CHARGED PARTICLES USING AN ELECTRIC FIELD

[76] Inventor: Roy C. Levitt, 1107 Timber Trail Rd., Towson, Md. 21204

[21] Appl. No.: 987,194
[22] Filed: Dec. 8, 1992
[51] Int. Cl.$^6$ .................................. G01T 1/29
[52] U.S. Cl. ............................ 250/374; 250/385.1
[58] Field of Search .................. 250/374, 385.1, 381

[56] References Cited

U.S. PATENT DOCUMENTS

| | | |
|---|---|---|
| 2,499,830 | 3/1950 | Molloy . |
| 3,483,377 | 12/1969 | Borkowski et al. . |
| 3,517,194 | 6/1970 | Borkowski et al. . |
| 3,898,465 | 8/1975 | Zaklad et al. . |
| 3,911,279 | 10/1975 | Gilland et al. . |
| 3,975,638 | 8/1976 | Grunberg et al. . |
| 3,975,639 | 8/1976 | Allemand . |
| 4,017,733 | 4/1977 | Ishii et al. ................ 250/381 |
| 4,149,109 | 4/1979 | Kreutz et al. . |
| 4,150,290 | 4/1979 | Erskine et al. . |
| 4,311,908 | 1/1982 | Goulianos et al. ........... 250/374 |
| 4,336,455 | 6/1982 | Bryant ........................ 250/381 |
| 4,704,536 | 11/1987 | Sugiyama et al. ............ 250/381 |
| 4,707,608 | 11/1987 | DiBianca . |
| 4,830,830 | 5/1989 | Tamotu et al. . |
| 4,864,141 | 9/1989 | Lewiner ..................... 250/381 |
| 5,059,802 | 10/1991 | Filthuth ..................... 250/374 |
| 5,083,027 | 1/1992 | Kuhn ......................... 250/374 |
| 5,099,129 | 3/1992 | Pullan ....................... 250/374 |

OTHER PUBLICATIONS

R. W. Hendriks, "One-and Two-Dimensional Position-Sensitive X-Ray and Neutron Detectors", *Trans. Amer. Crystallographic Ass'n* vol. 12, pp. 103–146 (1976).
Laskey et al., "Quantitive Film Detection of $^3H$ and $^{14}C$ in Polyacrylamide Gels by Fluorography", *Eur. Biochem.* vol. 56, pp. 335–341 (1975).
D. Halliday et al., *Physics*, Part II, Chapt. 30, John Wiley & Sons, Inc. (1962).

*Primary Examiner*—Paul M. Dzierzynski
*Assistant Examiner*—Drew A. Dunn
*Attorney, Agent, or Firm*—Burns, Doane, Swecker Mathis

[57] ABSTRACT

Improved efficiency and spatial resolution are obtained without collimators or ionizable media by a locating system in which radioactive sources to be located are disposed within an electric field sufficient to force radio-emitted charged particles directly towards an oppositely charged electrode without appreciable scattering. In one aspect, the two oppositely charged electrodes are separated at a distance that avoids arcing. In other aspects, dielectric materials may be disposed between the electrodes, and the area between the electrodes can be evacuated.

7 Claims, 2 Drawing Sheets

PROCESS AND APPARATUS FOR LOCALIZING A SOURCE OF CHARGED PARTICLES USING AN ELECTRIC FIELD

BACKGROUND

This invention relates to processes and apparatus for locating sources of charged particles, and more specifically to such processes and apparatus having high spatial resolution and efficiency.

The need to identify the components of unknown mixtures is faced in a wide variety of situations. One way to meet this need is physically to separate the components, and many separation techniques are in common use in science and industry. Most separation techniques exploit differences in the physical/chemical properties of the components of the mixture. The components of a mixture that have been separated into agglomerations of like molecules or particles can then be recognized by their locations in space. Frequently, the component particles are labeled with a radioactive substance to facilitate the determination of their spatial locations.

The location of each radio-labeled component (agglomeration of like particles) of a mixture can be determined using a number of techniques. If the components are separately disposed on, or through, a solid or semi-solid medium, the medium might be divided into pieces and the radioactivity of each piece directly determined. This method provides adequate quantitative results, but its resolution is limited in practice by the minimum size of slices that can be used. Also, it may not be practical to count a very large number of slices.

A number of position-sensitive radiation detectors are known. Some use multiple closely spaced detectors to determine the location of a source of incident radiation; others use position-sensitive counters developed for use in high energy physics experimentation. This latter type of apparatus typically uses a wire or a grid of wires disposed in an ionizable medium (liquid or gas). When a charged particle emitted by the radioactive label passes through the medium, it triggers an avalanche of charges (typically electrons), which induces a pulse on an electrical delay line. The timing of the pulse is used to infer the location of the source of the incident charged particle. Such detectors are described in U.S. Pat. Nos. 3,483,377 and 3,517,194 to Borkowski et al.; 3,911,279 to Gilland et al.; 3,975,638 to Grunberg et al.; and 4,149,109 to Kreutz et al.; and in Hendrix, "One and Two Dimensional Position-Sensitive X-Ray and Neutron Detectors", *Trans. Amer. Crystallographic Ass'n* vol. 12, pp. 103–146 (1976).

To improve the spatial resolution of such devices (viz., the ability to recognize two close sources as distinct), electronic controls that limit pulse length or collimators that limit the angular extent of particles admitted to the detector have been added. Such detectors are described in U.S. Pat. Nos. 3,898,465 to Zaklad et al.; 3,975,639 to Allemand; 4,311,908 to Goulianos et al.; and 4,707,608 to DiBianca.

Another well known type of position-sensitive radiation detector employs photographic film, and is described in Laskey et al., "Quantitative Film Detection of $^3H$ and $^{14}C$ in Polyacrylamide Gels by Fluorography" *Eur. Biochem.* vol. 56, pp. 335–341 (1975), for example.

The fact that radioactive sources spontaneously emit radiation into $4\pi$ steradians leads to two problems in the prior detectors, the first of which is limited spatial resolution. Prior position-sensitive detectors typically collect the spontaneously emitted radiation through a "window" in a counting tube or like component. Thus, the ability of the detector to determine where the source is located is inherently limited by parallax. Moreover, the farther the detector must be from the source, the larger must be the distance between the sources, e.g., two components of a mixture, for the detector to recognize them as separate.

These effects are illustrated in FIG. 1, which depicts three point sources 1–3 and a detector 4. The sources spherically emit radiation, indicated by the arrows, portions of which impinge on the detector. Although the sources 1–3 are well separated, the detector 4 has difficulty resolving sources 1 and 2 and sources 2 and 3 because radiations from the sources overlap on the detector.

Placing the detector as close as possible to the source and limiting the size of a window between the detector and sources can increase the spatial resolution to as good as ±0.5 mm, depending on the nature of the radioactive source. In gas-ionization detectors that amplify the radio-emitted particles by creating an electron avalanche, such as the detector described in U.S. Pat. No. 5,083,027 to Kuhn, devices that shape or collimate the ionization avalanche can also be included.

Nevertheless, using a small window worsens the prior detectors' second problem, which may be called limited efficiency. The fact that most of the radio-emitted particles do not impinge on the detector (see FIG. 1) is an inherent limitation on the detector's efficiency. Additional losses result from the incorporation of electronic controls on pulse length.

Moving a windowed detector closer to a source improves spatial resolution by reducing parallax between the source and the window. Charged particles entering the counting "chamber" are detected through the electron avalanches they trigger, but avalanche electrons moving at many angles away from the detector are either lost or broaden the source image. Moving the detector closer to the window within the counting chamber may reduce parallax but it also decreases efficiency. The closer the window is to the detector, the less likely it is that the small number of radio-emitted charged particles moving in the direction of the detector will collide with ionizable gas molecules in the chamber and induce avalanches.

The above-cited Kuhn patent describes an apparatus that improves the degree of locational resolution by placing the source in a test piece within the counting chamber (viz., the window is eliminated). Another fundamental aspect of the Kuhn apparatus is its use of mechanical collimators that improve resolution by shaping the electron avalanche. The Kuhn apparatus relies on a location-sensitive proportional counting tube that uses an electron avalanche induced in an ionizable gas by passage of a radio-emitted charged particle. The spatial resolution of such a system increases as the aperture of the collimator decreases, but the detector's efficiency decreases at the same time.

The system described in the Kuhn patent has a drift field, as in a number of other position-sensitive counters, that directs the avalanche electrons to the detector. Avalanche electrons moving at many angles away from the detector are either lost or drift irregularly towards the detector, broadening the source image.

In view of these problems with the previous detectors, there is a clear need for a detector that has both high spatial resolution and efficiency.

SUMMARY

In accordance with Applicant's invention, improved efficiency and spatial resolution are obtained without collimators by a locating system in which radioactive sources to be located are disposed within an electric field sufficient to force radio-emitted charged particles directly towards an oppositely charged electrode without appreciable scattering. In one aspect, the two oppositely charged electrodes are separated at a distance that avoids arcing. In other aspects, dielectric materials may be disposed between the electrodes, and the area between the electrodes can be evacuated.

BRIEF DESCRIPTION OF THE DRAWINGS

The advantages, features and details of the invention will become apparent from reading the following detailed description of preferred embodiments illustrated in the accompanying drawings in which.

DETAILED DESCRIPTION

It will be appreciated that a magnetic or electric field can "direct" or force charged particles into a particular direction. Some previous detectors, such as that described in the Kuhn patent, use electric fields to direct the avalanche of electrons triggered by the passage of a radio-emitted particle. A suitably intense field can force most if not all radio-emitted charged particles to impinge on the detector.

My invention uses an electric field to force charged particles into a predetermined direction for the purposes of imaging (i.e., defining the spatial location over time) the species from which the charged particles were emitted. In accordance with the invention, substantially all the radio-emitted particles are collected, and such a detector has the enormous advantages of high spatial resolution and efficiency.

The present locating technique may be called radiographic alignment (RA), and can be implemented in a detection system for localizing the components of mixtures that have been radioactively labeled and separated by almost any separation technique. For example in a system for gene and DNA identification, fragments of DNA that differ in length by one nucleotide can be labeled with $^3H$, $^{14}C$, $^{32}P$, $^{33}P$, or $^{35}S$ and separated by polyacrylamide electrophoresis; the agglomerations of same-length fragments can be localized with high resolution and efficiency using RA. It will be appreciated that other radioactive labels can be used.

Figure 1:
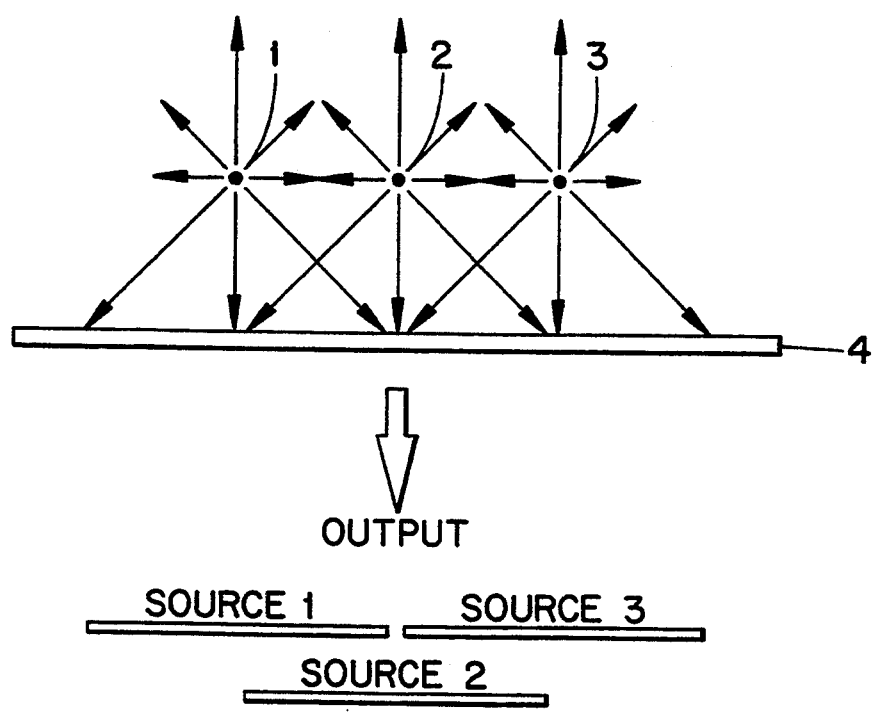
FIG. 1 schematically illustrates a typical arrangement of radioactive point sources and a detector.
Figure 2:
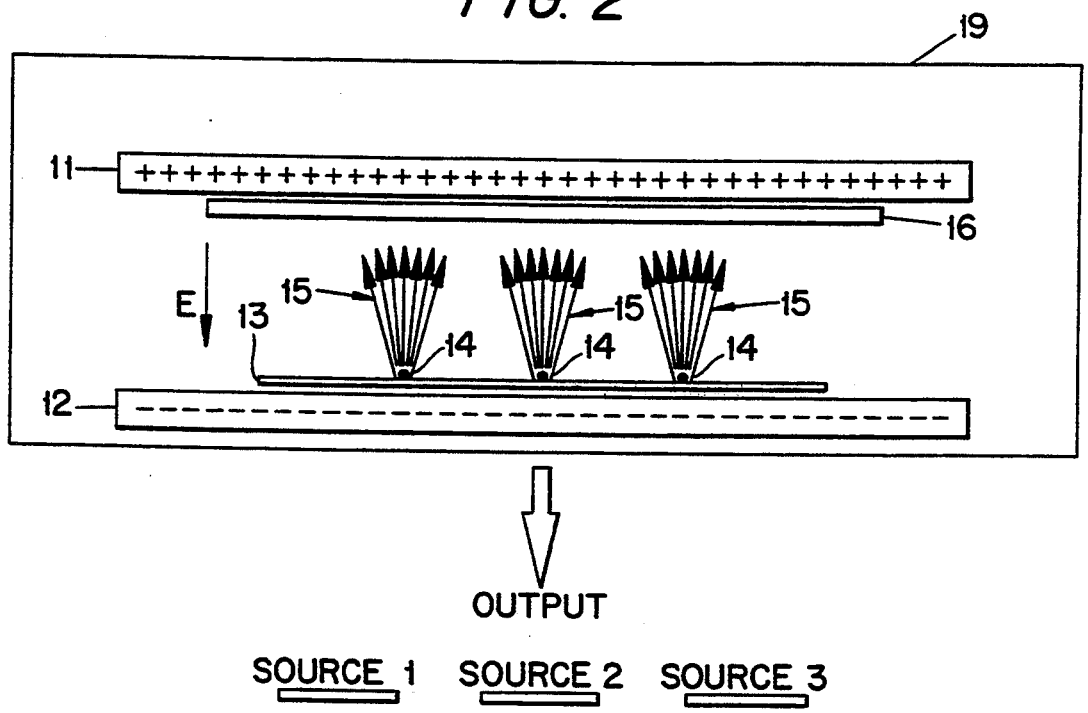
FIG. 2 shows a first embodiment of a detection system in accordance with the present invention.

Referring now to the other drawings, wherein like reference numerals designate like parts throughout, FIG. 2 illustrates a location system in accordance with one aspect of the invention. Two electrodes 11,12 having opposite charge produce therebetween a uniform electric field indicated by the arrow E. The electrodes 11,12 are preferably planar for convenience in construction and achievement of a uniform field, although it will be appreciated that other electrode shapes could be used subject to the usual high-voltage design considerations relating to arcing. A uniform field is desirable because the field strength influences both efficiency and resolution, but non-uniform fields produced by other electrode shapes can be characterized and compensated for during data analysis.

Disposed between the electrodes 11,12 is a support 13 for one or more radioactive sources 14 that spontaneously emit charged particles 15, which are forced by the electric field toward the oppositely charged electrode. The charged particles 15 are intercepted by an otherwise conventional detector 16 which characterizes the sources, i.e., determines their intensities and positions. In a gene identification system, the support 13 could simply be a chromatogram or gel upon or through which radio-labeled fragments have been separated.

The sources' radioactive emissions must include charged particles that can be aligned by the electric field between the electrodes 11,12. Although FIG. 2 shows electrode 11 having positive charge and electrode 12 having negative charge, it will be appreciated that the charge polarities can be reversed, for example, to accord with the polarity of the radio-emitted particles or the relative positions of the sources and detector.

The output of the detector 16 is a set of images of the sources. If the detector 16 is linear, like that described in the above-cited patent to Goulianos et al., the images are discrete, one-dimensional replicas of the sources. If the detector 16 is two-dimensional, like those described in the above-cited patents to Gilland et al. and DiBianca, the images are two-dimensional replicas. Such suitable detectors generally have collectors of sufficient resistance per unit length to provide output voltage pulses having rise times that are proportional to the location of a source with respect to the collector. The Goulianos et al., Gilland et al., and DiBianca patents are expressly incorporated here by reference. Such detectors would be disposed between the electrodes 11,12 in accordance with conventional high-voltage design practices to avoid arcing.

Another suitable detector 16 is a photographic film such as that described in the above-cited publication by Laskey et al., which is also expressly incorporated here by reference. Use of Applicant's location system with well-known film detectors is particularly advantageous because it solves many problems of such detectors. As described in the Laskey et al. publication, the step in fluorography limiting the rate that results are obtained is forming stable pairs of silver atoms in silver halide crystals. Each collision between a radio-emitted charged particle and a crystal produces one potentially developable silver atom, but a single silver atom will thermally decompose back to a silver ion unless a second collision timely occurs.

Applicant's RA technique remedies this problem in film detectors by enhancing the probability of second collisions before thermal decomposition occurs. Moreover, the absorbance, or density, of an image produced on a film via RA is proportional to the concentration of radioactivity in the source; such proportionality is generally not provided by conventional fluorography. Also, image density with RA is proportional to the exposure duration until all silver ions in a crystal are developable. Furthermore, a film with RA is sensitive at room temperature because of the reduced likelihood of thermal decomposition, and the sensitivity of the film is effectively increased, viz., a film used with RA is able to detect smaller amounts of radioactivity than the film used with conventional fluorography.

A film detector is currently preferred for an apparatus in accordance with Applicant's invention because it is believed that such a detector is simple to use and has the potential for high spatial resolution. A film detector can be thin and can lie flat, thereby simplifying its placement between and the design of the electrodes 11,12. It will be appreciated, however, that other types of detector, such as those described in the patents discussed above, could be used.

The location of a source 14 is determined by the location of the charged particles 15 incident on the detector 16. Charged particles 15 moving in a direction other than perpendicular to the detector 16 broaden the image of their source. The movement of a charged particle in the electric field is determined by the kinetic energy K of the particle (where $K = \frac{1}{2} mv^2$) and the field strength E (where $E \propto V/d$). A voltage difference between the electrodes 11,12 on the order of ten kilovolts and a distance between them of approximately one centimeter or less is suitable for the radioactive labels typically used for DNA typing.

In order to increase the field strength if needed for labels that emit higher-energy particles, the distance between the electrodes can be reduced and/or the voltage difference between the electrodes can be increased. It will also be appreciated that the spatial resolution in determining the locations of a given type of label can be increased in the same way. For example, the distance between the detector 16 and the sources 14 can be reduced, thereby reducing parallax, either by simply disposing them closer together and/or by decreasing the distance between the electrodes.

Thus, Applicant's location system minimizes parallax and locates radioactive sources with very high spatial resolution and efficiency without collimators or an ionizable medium. As described above, the polarity of the voltage applied to the electrodes 11,12 or the positions of the sources 14, and detector 16 can be selected according to the type of particles emitted by the sources.

Figure 3:
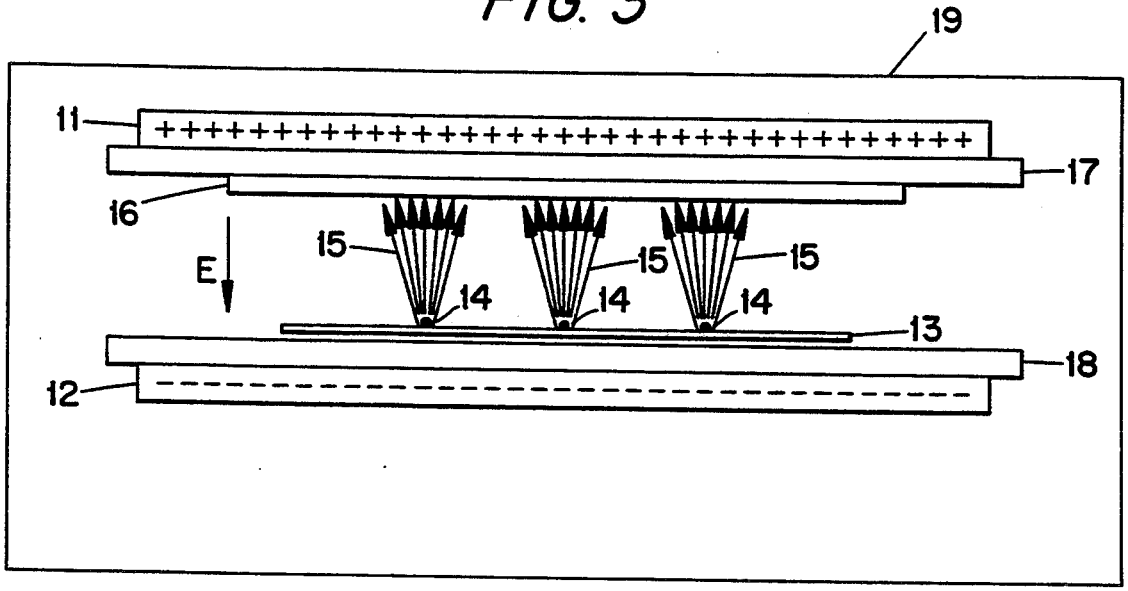
FIG. 3 shows another embodiment of the detection system.

To accommodate a voltage high enough to prevent significant lateral movement of charged particles emitted by commonly used radioactive sources but avoid arcing between the electrodes, a dielectric can be introduced between the electrodes 11,12. As seen in FIG. 3, a location system in accordance with another aspect of the invention includes a dielectric plate 17 disposed between the electrode 11 and detector 16 and a dielectric plate 18 disposed between the electrode 12 and the substrate 13. The plates 17,18 allow a smaller distance between the electrodes 11,12 and increased field strength.

It will be appreciated that the shapes of the dielectrics 17,18 would probably generally conform to the shapes of the electrodes 11,12. It is believed that a wide variety of dielectric materials could be used, including, for example, TEFLON polymer. The particular dielectric material used would depend on the voltage across and spacing of the electrodes 11,12, and could be selected to optimize other aspects of the apparatus. For example, a dielectric material might be selected to make the electrodes closer together and/or to reduce the voltage needed. The important aspects of using dielectrics are well known, and are described in D. Halliday et al., *Physics*, Part II, John Wiley & Sons, Inc. (1962), for example.

In accordance with another aspect of the invention, the location system can be disposed within a chamber that is then evacuated. Such a chamber 19 is indicated in FIGS. 2 and 3, and would be conventionally constructed to accommodate the location system and to withstand the ambient air pressure. The vacuum between the electrodes need only be sufficient to provide additional protection against arcing and allow a higher electric field, which may be needed for radioactive sources that emit particles having higher kinetic energy.

It is, of course, possible to embody the invention in specific forms other than those described above without departing from the spirit of the invention. The embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus for characterizing a radioactive source of electrically charged particles comprising:
   two electrodes, the electrodes being chargeable such that an electric field is formed therebetween when the electrodes are charged;
   a substrate disposed between the two electrodes for supporting the radioactive source; and
   means, disposed between the two electrodes, for detecting electrically charged particles emitted by the radioactive source,
   wherein the electric field directs the electrically charged particles emitted by the source to the detecting means when the electrodes are charged.

2. The apparatus of claim 1, further comprising at least one dielectric plate disposed between the electrodes.

3. The apparatus of claim 1, wherein a vacuum exists between the two electrodes.

4. A method of characterizing a radioactive source of electrically charged particles comprising the steps of:
   positioning the radioactive source between two electrodes;
   evacuating an area between the two electrodes;
   forming a high-intensity electric field between the two electrodes sufficient to direct a substantial proportion of the electrically charged particles emitted by the radioactive source toward one of the two electrodes; and
   detecting the electrically charged particles emitted by the radioactive source.

5. A method of characterizing a radioactive source of electrically charged particles comprising the steps of:
   positioning the radioactive source between two electrodes;
   forming an electric field between the two electrodes sufficient to direct the electrically charged particles emitted by the radioactive source toward one of the two electrodes;
   detecting the electrically charged particles emitted by the radioactive source; and
   disposing a dielectric plate between the two electrodes.

6. A method of characterizing a radioactive source of electrically charged particles comprising the steps of:
   positioning the radioactive source between two electrodes;
   substantially filling an area between the two electrodes with a medium that is substantially non-ionizable by the electrically charged particles emitted by the radioactive source;

forming a high-intensity electric field between the two electrodes sufficient to direct a substantial proportion of the electrically charged particles emitted by the radioactive source toward one of the two electrodes; and detecting the electrically charged particles emitted by the radioactive source.

7. The method of claim 6, wherein the medium is air.

* * * * *